July 23, 1935.　　　　　T. B. FLANAGAN　　　　　2,009,019
WEIGHING SCALE
Filed Oct. 27, 1930　　　　2 Sheets-Sheet 1

INVENTOR.
Thomas B. Flanagan.
BY
Edwin P. Corbett
ATTORNEYS.

July 23, 1935.                T. B. FLANAGAN                2,009,019
                               WEIGHING SCALE
                            Filed Oct. 27, 1930              2 Sheets-Sheet 2
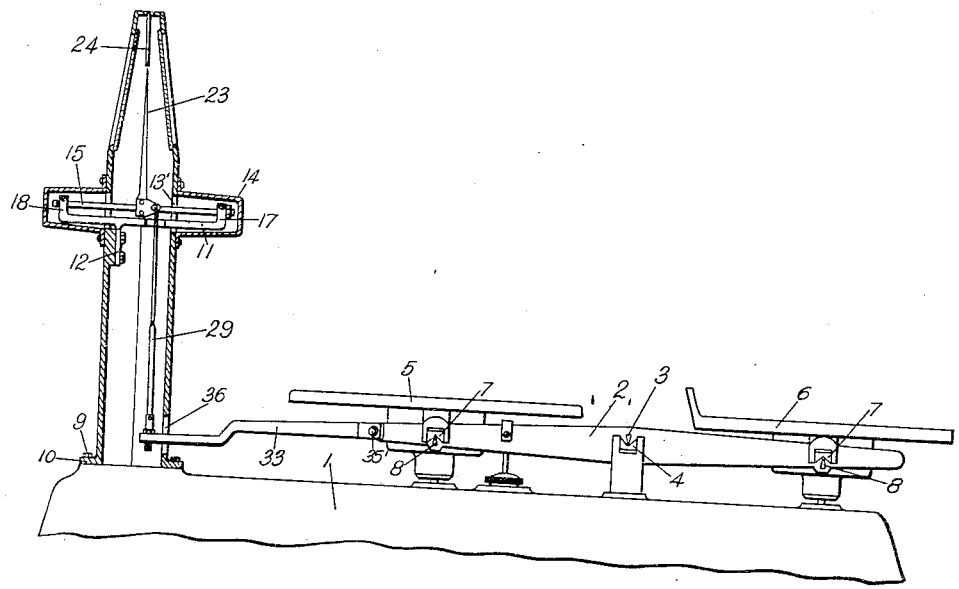
Fig. 4
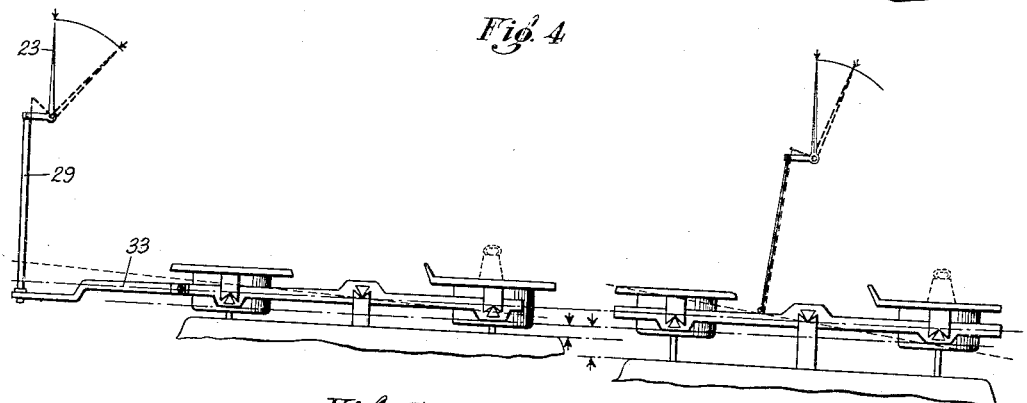
Fig. 5        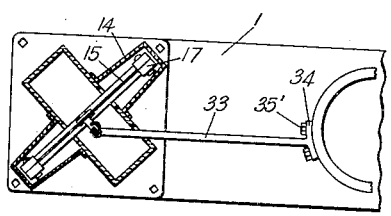  Fig. 6
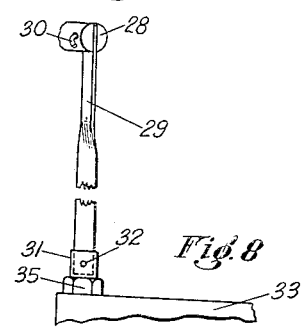
Fig. 7                                              Fig. 8
INVENTOR.
Thomas B. Flanagan.
BY
ATTORNEYS.

Patented July 23, 1935

2,009,019

UNITED STATES PATENT OFFICE 2,009,019

WEIGHING SCALE

Thomas B. Flanagan, Columbus, Ohio, assignor to The Exact Weight Scale Company, Columbus, Ohio, a corporation of Ohio Application October 27, 1930, Serial No. 491,353

15 Claims. (Cl. 265—59)

This invention relates to weighing scales. It has to do, particularly, with that type of scale known as the over-and-under weight scale, although there are some features of the invention that may be applicable to other types of scales.

In weighing scales of the over-and-under type, it has been customary to provide an even-balanced beam with an indicator operating in a tower and generally located in between the platters carried by the beam. This has resulted in imposing a limitation upon the size of platters which might be used while still maintaining a centralized load and avoiding excessive overhang in these platters with consequent tendency to binding of the check rod and other parts.

Likewise, in the prior art, it has been customary to connect the indicator to the beam substantially close to the center of the beam and, practically always, in between the center of the beam and one or both of the outriders. Since the swing of the indicator pointer and the range of the indicator dial must be of adequate length, the connection of this indicator pointer to the beam in between the outrider and the center of the beam has resulted in quite a great fall of the outrider platters, since the point of connection of the indicator to the beam must have a substantial travel and the travel of the outrider platters must be even greater. Obviously, the greater the fall of the outriders, the greater must be the wear and tear upon all of the moving parts of the scale.

Furthermore, in prior art devices, the usual means for operating the indicator from the beam has necessitated the swinging of the indicator pointer in a plane substantially parallel to the plane of oscillation of the beam. Under certain conditions, this is undesirable.

One of the objects of this invention is to provide an over-and-under weight scale wherein it is possible to use comparatively large platters without the introduction of excessive over-hang in the platters and with the maintenance of a centralized load.

Another object of this invention is to provide an over-and-under weight scale wherein the fall of the outriders is decreased while the swing of the indicator pointer and the range of the indicator dial are increased.

Another object of this invention is to provide an over-and-under weight scale with a means for operating the indicator of such form that the indicator tower and dial can be placed at any desired angle with relation to the beam.

Another object of this invention is to provide an over-and-under weight scale wherein the beam will start and move rapidly toward its point of balance and will stop with similar rapidity.

One of the features of my invention consists in the provision of an over-and-under weight scale wherein the indicator and the tower which contains it is placed at one end of the scale or, at least, is placed in such position that it will not interfere with the use of comparatively large platters. This is preferably accomplished by the connection of the indicator to one end of the beam by means of an extension member so that this point of connection traverses a substantially long arc in its operation of the indicator while the arcs traversed by the outrider pivots are comparatively shorter with a consequent substantial decrease in the fall of the outriders.

Another feature of this invention consists in the use of a means for operating the indicator pointer by a direct push and pull operation. This renders possible the operation of the indicator pointer either in a plane parallel to the plane of oscillation of the beam or at any desired angle thereto. It further makes possible the positioning of the dial at any angle with relation to the plane of oscillation of the beam.

Another feature of my invention consists in the location of the dash pot approximately at the end of the scale beam instead of close to the center of the beam. This increases the length of the lever arm through which the dash pot acts and thereby renders this dash pot more effective to check unnecessary vibrations of the beam.

Other objects and advantageous features of this invention will be noted in the following detailed description and in the accompanying drawings, wherein similar characters of reference designate corresponding parts and wherein:

Figure 4 is a side elevation partly in section of the scale shown in Figure 1, with parts broken away to illustrate the connection between the indicating mechanism and the beam.

Figures 5 and 6 are comparative views, in side elevation, illustrating the decreased fall of the outriders and increased movement of the indicator in a scale having the indicator pointer connected to the end of the beam in comparison with a scale which is of the same dimensions but which has the indicator pointer connected to the beam adjacent the center thereof.

Figure 7 is a plan view, partially broken away, showing the indicator tower at an oblique angle with relation to the plane of oscillation of the beam.

Figure 8 is a perspective view illustrating the connections between the indicator and the beam as they are disposed in Figure 7.

Figure 1:
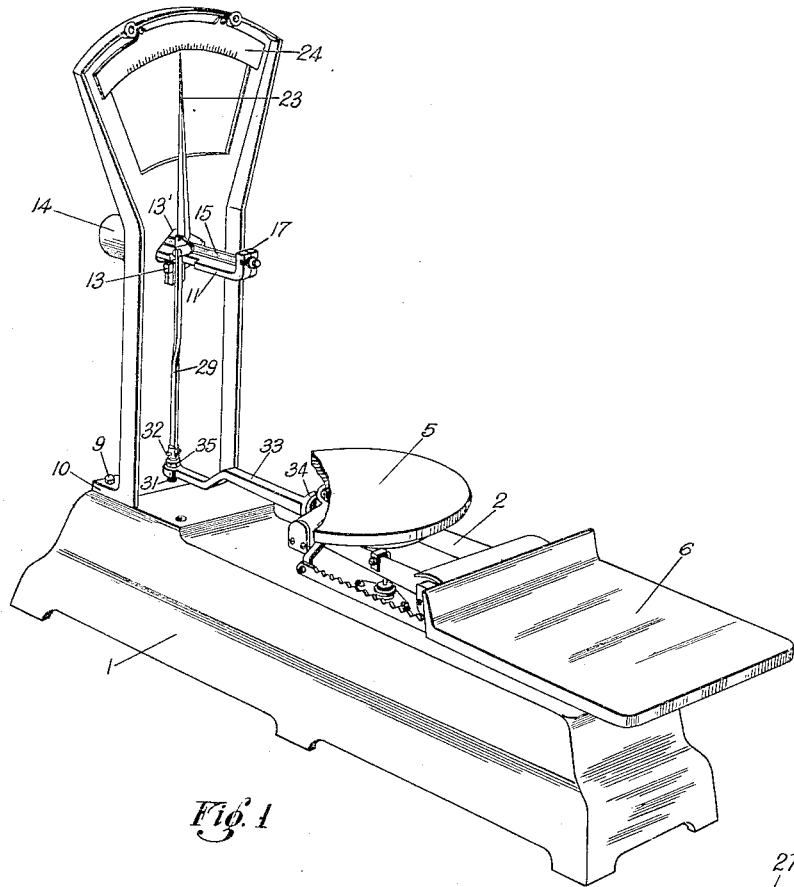
Figure 1 is a perspective view of the preferred embodiment of my weighing scale, with certain of the parts broken away to more clearly illustrate the novel features thereof.

With reference to the drawings, especially Figures 1 and 4, I have shown the preferred embodiment of my invention as comprising a scale having a base 1 that is preferably of the form shown, although it may be of any form desired. A beam 2, which is preferably of the even balanced type, is pivotally supported on the base 1 by means of the oppositely disposed knife-edged bearings 3 that engage with the trunnions 4.

The scale platters, which comprise a weight pan 5 and a commodity pan 6, are mounted on the outriders located at opposing ends of the beam, by means of trunnions 7 and knife edge bearings 8. The outrider stems extend below the top plate of the scale and are connected to a check rod structure, not shown.

In the absence of a centrally located indicator tower, it is possible to utilize the additional space thereby obtained for the use of larger platters. Furthermore, platters of varying surface area may be substituted, one for the other, while still maintaining the centers of the platters in the same vertical planes as the knife edges which support them, without increasing the length of the beam, or the size of the scale.

Located at one end of the base, and extending upwardly therefrom is an indicator tower that is preferably formed in two sections which permits of the assembling of a torsional element support on one of the sections prior to finally placing the two sections together. As will be noted, this housing is located so that the dial carried thereby will be disposed transversely of the longitudinal center line of the scale beam, although it will be hereinafter apparent that it may be finally positioned at almost any angle thereto. The tower is preferably bolted to the base by means of the bolts 9 which extend through a foot flange 10 of each section of the housing.

One of the sections of this indicator housing is adapted for the mounting of a torsional element support 11, being secured in position by means of a depending foot 12 adapted to seat between spaced abutments 13 on the indicator housing. This foot may be secured by means of bolts or other suitable devices. The torsional element support is somewhat longer than the width of the indicator housing and openings 13' are provided through which the ends of this support extend, cup-like dust covers 14 being provided to cover such ends.

The support 11 is adapted to hold a torsion strip 15 in its desired position and it is so designed as to embody means for adjusting this torsion element in various ways to obtain varying resistances and also to obtain the greatest amount of efficiency therefrom. This torsion element support is preferably constructed in the manner shown in Figure 2 wherein it is shown as comprising an elongated body portion having its ends turned upwardly at right angles thereto so as to form split collars 16 and 17. Bolts 18 provide a means for tightening or loosening the split collars about the semi-circular slips 19 disposed on opposing sides of each end of the torsion element.

In the assembling and adjustment of this device, the bolts 18 are loosened sufficiently to permit the slips to pass through the split collars into proper relation with the ends of the resilient element 15. The pins 20 are then inserted through suitable openings in the slips and resilient element 15, such pins being of sufficient length to extend outwardly from the slips and engage the outer surface of the split collars. One of the pins rests in a groove 21 in the split collar 17. Furthermore, the slips at this end of the resilient element are threaded for the reception of the nut 22.

In adjusting the tension of this torsion element, the nut 22 is screwed onto the threaded portion of the cooperating slips sufficiently far enough so that the inner surface thereof will rest against the outer surface of the split collar 17. Then the nut is rotated to tension the torsion element to the required degree, the pin 20 resting in the slot 21 preventing rotation of this torsion element. When the torsion element has been sufficiently stressed, the bolts 18 are tightened to draw each collar into such relation with the slips 19 that there will be no opportunity for bodily rotation of the torsional element in its support.

Figure 2:
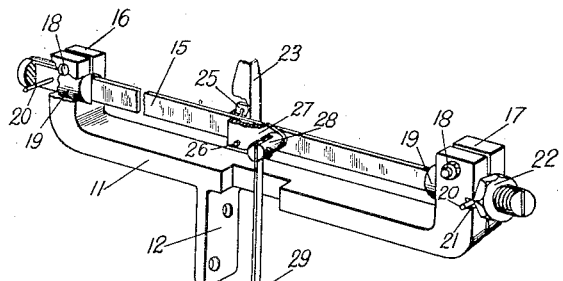
Figure 2 is a detail, in perspective, of the connection between the beam and the resilient element which I employ for returning the beam to balanced position.
Figure 3:
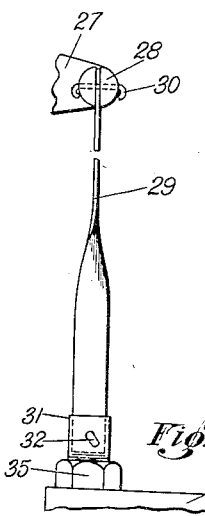
Figure 3 is an enlarged detail illustrating the pivotal connection between the thrust rod and the resilient member as well as the pivotal connection between this thrust rod and the elements which are carried by the beam.

As shown in Figures 1, 2 and 4, a pointer 23 is adapted to be mounted on the torsion element 15 at some point intermediate the length thereof. The upper end of this pointer cooperates with a graduated dial 24 supported by one of the sections of the housing.

The connection between the indicating pointer and the torsion element may be effected in various ways, although I preferably utilize a small rectangular plate 25 that is connected to the inner side of the base of the pointer which in turn is connected to the torsion element, as shown. The plate 25 may be drawn tight by means of bolts 26 that are spaced on opposing sides of the torsion element and are screwed into suitable threaded apertures formed in a member 27 embracing the opposing side of the torsion member. It can be readily seen, that the pointer may be adjusted longitudinally of the torsion element, if desired.

The member 27 forms an integral part of the apparatus for connecting the pointer to the beam. In effecting this connection, a bifurcated lug 28, formed as a part of the member 27, and extending outwardly therefrom, is pivotally secured to one end of a push rod 29 by means of a cotter pin 30. The opposing end of the push rod is also pivotally secured to the bifurcated end of a threaded rod 31 by means of a cotter-key 32. The threaded portion of the rod 31 is screwed into a threaded bore in one end of an arm 33 that is connected to the scale beam 2 by means of a saddle 34. A nut 35 mounted on the threaded portion of the rod 31 operates as a means for locking such rod in any position desired.

Referring again to the arm 33, it will be noted that the saddle 34 is arcuate in form so that it will conform to the rounded end of the scale beam, Figure 7, where it may be secured by means of suitable bolts 35'. The arm 33, when mounted on the scale beam, is in offset relation to the vertical longitudinal center line of the scale beam although it parallels such line. When all the parts of the scale are in assembled relation, the outer end of the arm is adapted to be located within the housing, a suitable opening 36 being provided in one of the sections.

The utilization of a push rod, such as that shown at 29, which is connected at one end, to the beam and at the other end to the indicator, makes possible the converting of the up and down motion of the beam into a motion transversely thereof by the pointer. The construction of the push rod is also novel in that this element has been twisted so that the upper end thereof, that is in pivotal engagement with the lug 28, lies in a vertical plane that extends transversely of the scale beam. However, the lower end of this push rod is turned at right angles to the upper end and lies in a vertical plane that is in parallelism with the longitudinal center line of the scale beam. It is desirable that the arm 33 be of such length and so positioned as to bring the bifurcated rod 31 into a position directly under the bifurcated lug 28 with the two pivots 30 and 32 at right angles to each other but in substantially vertical alignment so that the push rod 29 will be held in a vertical position, or, at least, in a position as near to the vertical as possible. The connection of the indicator to the end of the scale beam in the manner just described ensures that a direct push and pull will be transmitted to the indicating pointer which plays an important part in decreasing the fall of the beam.

By reference to Figure 4, it will be noted that the dash pot which is utilized to minimize the non-essential vibrations of the beam is placed beneath the beam closely adjacent one end thereof, as opposed to the usual location of the dash pot adjacent the center of the beam. Since, in this structure, the dash pot operates through a greater length of the beam, it is more effective to check movement thereof.

As hereinbefore mentioned, the indicator tower may be positioned at an angle other than a right angle to the scale beam. This is best illustrated in Figures 7 and 8 wherein the tower is shown as being turned at still another angle. To accomplish this, the bolts 9 may be removed and the tower may be rotated to this position and again firmly bolted to the base. Of course, before turning the tower, the push rod 29 is disconnected. However, when the tower is repositioned with the bifurcated lugs 28 and 31 again aligned, the push rod may be easily twisted to compensate for any change in angular relation between the pivot axes at opposite ends of the push rod.

The operation of this scale will be apparent from the preceding description and the drawings. Oscillation of the scale about its central pivot will cause the arm 33 to effect a direct push or pull on the bifurcated lug 28 through the medium of the push rod 29. This will cause the indicator to be moved across the dial in exact proportion to the movement of the scale beam.

One important phase of this invention has to do with bringing about a material reduction in the fall of the beam and the outriders while, at the same time, increasing the swing of the indicator pointer to create a more rapid movement and more sensitive readings. This has been accomplished by the connection of the indicator to the end of the scale beam. In prior art types of scale, the fall of the beam is greatly in excess of the beam fall in my novel type of scale and I have thought it advisable to present comparative drawings illustrating this variance in beam movement. The prior art type of scale with the centrally located indicator is best shown in Figure 6. Figure 5 is illustrative of a weighing scale embodying the connection of the indicator to the end of the beam.

Before entering into a detailed discussion of these two weighing scales, it might be well to point out that in a balanced beam, the extremities of the lever are subject to movement through an arcuate path of greater length than a given point adjacent the fulcrum. Likewise, the angular acceleration of the mass at a point farthest removed from the fulcrum is greater than a point adjacent such fulcrum.

Returning now to the comparative drawings of Figures 5 and 6, it will be noted that I have shown two even balance scale beams of equal lengths having outriders and platters mounted thereon at points equidistant from the fulcrum. The clearance between the bottom of the outrider and the top plate of the novel scale shown in Figure 5 is greatly reduced over the clearance of the beam shown in Figure 6. This is made possible by the end connection with the indicator which reduces the oscillatory range of the beam as will be hereinafter related.

Each of the scales is connected to a pointer through the medium of a push rod but it will be noted that the dial of Figure 5 and the length of movement of the indicator pointer thereof are substantially longer than the dial and the length of movement of the indicator pointer of Figure 6. Thus, it will be seen that I am able to obtain a greately decreased fall of the outriders and, at the same time, obtain a greater indicating range of the indicator pointer and dial, even though the scale beams are of equal length. This results in an indicator pointer which starts and travels to the selected point of balance at a substantially increased speed and that indicates the successive variations in weight by comparatively longer and more readily visible movements. In other words, a more rapid and more sensitive reading is obtainable while a decreased wear on all moving parts results from the decreased fall of the outriders.

Another important advantage of my invention arises from the fact that the dial and the tower may be placed at the end of the scale, where the dial is more readily visible under certain conditions of operation. Furthermore, the structure is such that the dial may be positioned at any angle with relation to the plane of oscillation of the beam.

Still another advantage of my invention arises from the fact that the tower and the dial need not be located in between the platters and this condition may be obtained without in any way detracting from the simplicity of the scale and, in fact, while obtaining certain other highly advantageous features. The removal of the tower from in between the platters permits the use of platters of greatly increased size, while still maintaining a centralized load.

Still another advantage arises from the fact that my dash pot is placed adjacent the end of the beam and, since it operates through a greater length of the beam, it is more effective to reduce the non-essential vibrations of the beam to a minimum.

Having thus described my invention, what I claim is:

1. A weighing scale comprising a base, a beam mounted on said base and extending longitudinally thereof, an indicator housing located at one end of said base and transversely of the longitudinal center line of said scale beam, a torsion element carried by said indicating housing and extending in parallelism with the longitudinal center line of said scale beam and means for effecting a torsional stress of said torsion element in direct response to oscillation of said scale beam.

2. A weighing scale comprising a beam, a torsion element located above said beam and extending in parallelism therewith, a lever arm attached to said torsion element, and means for effecting a direct vertical push or pull on said lever arm in response to the movement of said beam to cause twisting of said torsion element.

3. A weighing scale comprising a comparatively long base member, an even balanced beam fulcrumed on said base member at a point intermediate the ends of said beam and extending longitudinally of said base member, a pair of outrider elements carried by said beam, one of said outrider elements being disposed at each side of the fulcrum point of said beam, an extension on one end of said beam, a tower located at one end of said base member and disposed transversely of said beam, the extension on said beam extending into said tower, a dashpot disposed near the end of said beam which has the said extension thereon and being operatively connected thereto, a torsion element mounted in said tower, an indicator member mounted on said torsion element and arranged to move transversely of the beam, and a rod member connected to said beam extension and said indicator for causing movement of said indicator in response to movement of said beam, said rod being adapted to exert push and pull forces to cause movement of said indicator and being of such a type that one end may be twisted at an angle to the other end.

4. A weighing scale comprising a base member, an even balanced beam fulcrumed on said base member at a point intermediate the ends of said beam, a pair of outrider elements carried by said beam, one of said outrider elements being disposed at each side of the fulcrum point of said beam, a dashpot mechanism connected to said beam at a point remote from the said fulcrum point, a tower located at one end of said base member and disposed transversely of said beam, an indicator mechanism disposed in said tower and including a pointer which moves transversely of said beam, means for causing movement of said pointer in response to movement of said beam, said means comprising a push rod which is operatively connected to said pointer and is connected to that end of said beam adjacent said tower at a point outside of the outrider element disposed adjacent said end of the beam, said rod being of such a type that one end may be twisted relative to the other end, and yieldable means for resisting movement of said indicator and said beam away from balanced position.

5. A weighing scale comprising a base member, an even balanced beam fulcrumed on said base member at a point intermediate the ends of said beam, a pair of outrider elements carried by said beam, one of said outrider elements being disposed at each side of the fulcrum point of said beam, a tower located at one end of said base member and disposed transversely of said beam, an indicator mechanism disposed in said tower and including a pointer which moves transversely of said beam, means for causing movement of said pointer in response to movement of said beam, said means comprising a push rod extending from said indicator mechanism to a point adjacent that end of said beam where the tower is located and outside of the outrider element on the said end of said beam, and yieldable means for resisting movement of said pointer and said beam away from balanced position.

6. A weighing scale comprising a base member, a beam fulcrumed on said base member at a point intermediate the ends of said beam, outrider elements carried by said beam on opposite sides of said fulcrum point, a tower located at one end of said base member and disposed transversely of said beam, an indicator mechanism disposed in said tower and including a pointer which moves transversely of said beam, means for causing movement of said pointer in response to movement of said beam, said means being operatively connected with that end of said beam, which is adjacent said tower, at a point outside of the outrider element on the corresponding side of the fulcrum point of said beam, and a resistance element for resisting movement of said pointer and said beam away from balanced position.

7. A weighing scale comprising a base member, a beam fulcrumed on said base member at a point intermediate the ends of said beam, outrider elements carried by said beam on opposite sides of said fulcrum point, a tower located at one end of said base member, an indicator mechanism disposed in said tower and including a pointer, means for causing movement of said pointer in response to movement of said beam, said means being operatively connected with that end of said beam, which is adjacent said tower, at a point outside of the outrider element on the corresponding side of the fulcrum point of said beam, and yieldable means for resisting movement of said pointer and said beam away from balanced position.

8. A weighing scale comprising an even balanced beam fulcrumed intermediate its ends, a pair of outrider elements carried by said beam, one of said outrider elements being disposed at each side of said fulcrum point of said beam, an extension on one end of said beam, an indicator mechanism including a pointer adapted to move transversely of said beam, means for operatively connecting said indicator mechanism to said beam to cause movement of said pointer in response to movement of said beam, said means comprising a push rod which extends from said indicator mechanism to a point on the said beam extension, and yieldable means for resisting movement of said pointer and said beam away from balanced position.

9. A weighing scale comprising a beam fulcrumed intermediate its ends, outrider elements carried by said beam on opposite sides of said fulcrum point, an indicator mechanism including a pointer adapted to move transversely of said beam and disposed adjacent one end of said beam, means for operatively connecting said indicator mechanism to said beam, to cause movement of said pointer in response to movement of said beam, said means comprising a push rod which extends from said indicator mechanism to a point adjacent that end of said beam, where the indicator mechanism is disposed, and outside of the outrider element on the corresponding side of the fulcrum point of said beam, and yieldable means for resisting movement of said pointer and said beam away from balanced position.

10. A weighing scale comprising a beam fulcrumed intermediate its ends, a pair of outrider elements carried by said beam, one of said outrider elements being disposed at each side of the fulcrum point of said beam, an indicator mechanism including a pointer disposed adjacent one end of said beam, means for operatively connecting said indicator mechanism to said beam to cause movement of said pointer in response to movement of said beam, said means comprising a member extending from said indicator mechanism to a point on said beam adjacent that end thereof where the indicator mechanism is disposed, and outside of the outrider element carried adjacent said end, and yieldable means for resisting movement of said pointer and said beam away from balanced position.

11. A weighing scale comprising a comparatively long base member, an even balanced beam fulcrumed on said base member at a point intermediate the ends of said beam and extending longitudinally of said base member, a pair of outrider elements carried by said beam, one of said outrider elements being disposed at each side of the fulcrum point of said beam, an extension on one end of said beam, a tower located at one end of said base member, the extension on said beam extending into said tower, a dashpot disposed near the end of said beam which has the said extension thereon and being operatively connected thereto, a torsion element mounted in said tower, an indicator member mounted directly on said torsion element, and a rod member connected to said beam extension at a point outside of the outrider member carried by the corresponding end of the beam and to said torsion element for causing movement of said indicator in response to movement of said beam, said rod being adapted to exert push and pull forces in response to movement of said beam to cause twisting of said torsion element and, consequently, movement of said indicator.

12. A weighing scale comprising a base member, a beam fulcrumed on said base member at a point intermediate the ends of said beam, outrider elements carried by the beam on opposite sides of the fulcrum point, indicating mechanism disposed at one end of the base, said indicating mechanism comprising a torsion element, an indicator member mounted directly on said torsion element, and a rod member connected to said beam at a point outside of the outrider on the corresponding end of the beam and to said torsion element for causing movement of said indicator in repose to movement of said beam, said rod being adapted to exert push and pull forces in response to movement of said beam to cause twisting of said torsion element and, consequently, movement of said indicator.

13. A weighing scale comprising a comparatively long base member, an even balanced beam fulcrumed on said base member at a point intermediate the ends of said beam and extending longitudinally of said base member, a pair of outrider elements carried by said beam, one of said outrider elements being disposed at each side of the fulcrum point of said beam, an extension on one end of said beam, a tower located at one end of said base member, the extension on said beam extending into said tower, a dashpot disposed near the end of said beam which has the said extension thereon and being operatively connected thereto, an indicator pointer disposed in said tower, means for operating said indicator pointer in response to movement of said beam, said means comprising a push rod which is operatively connected to said indicating pointer and is connected to the extension on said beam at a point outside of the outrider element on the corresponding end of the beam, and yieldable means for resisting movement of said indicator pointer and said beam away from balanced position.

14. A weighing scale comprising a base member, a beam fulcrumed on said base member at a point intermediate the ends of said beam, outrider elements carried by the beam on opposite sides of the fulcrum point, indicating mechanism disposed at one end of the base, means for causing operation of said indicating mechanism in response to movement of said beam, said means including a push rod which extends from said indicating mechanism to a point on that end of said beam adjacent said indicating mechanism and which point lies outside the outrider element carried by that end of the beam, and resilient means for resisting movement of said beam away from balanced position.

15. A weighing scale comprising a beam fulcrumed intermediate its ends, outrider elements directly carried by said beam at opposite sides of the fulcrum point thereof, indicating mechanism disposed adjacent one end of said beam, means for causing operation of said indicating mechanism in response to movement of said beam, said means comprising a member extending from said indicating mechanism to a point on said beam adjacent that end thereof where the indicating mechanism is disposed and which point lies outside the outrider element carried by that end of the beam.

THOMAS B. FLANAGAN.

CERTIFICATE OF CORRECTION.

Patent No. 2,009,019.　　　　　　　　　　　　　　　　　　　July 23, 1935.

THOMAS B. FLANAGAN.

It is hereby certified that error appears in the printed specification of the above numbered patent requiring correction as follows: Page 3, second column, line 32, for "greately" read greatly; and page 5, first column, line 55, claim 12, for "repose" read response; and that the said Letters Patent should be read with these corrections therein that the same may conform to the record of the case in the Patent Office.

Signed and sealed this 17th day of September, A. D. 1935.

Leslie Frazer (Seal)　　　　　　　　　　　　　　　　　　　　　Acting Commissioner of Patents.